Feb. 9, 1932.  D. P. MOLONY  1,844,041
AUTOMATIC CHARGE HEATING CONTROL FOR INTERNAL COMBUSTION ENGINES
Filed June 24, 1924
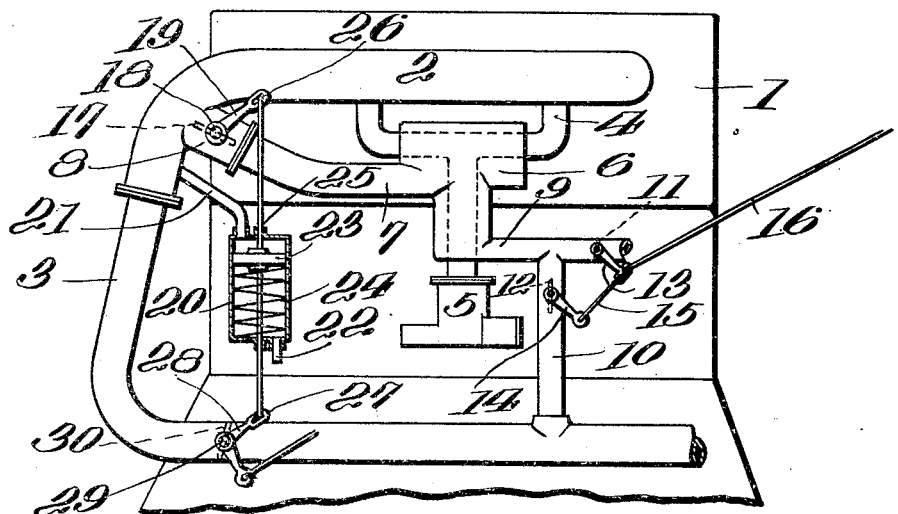
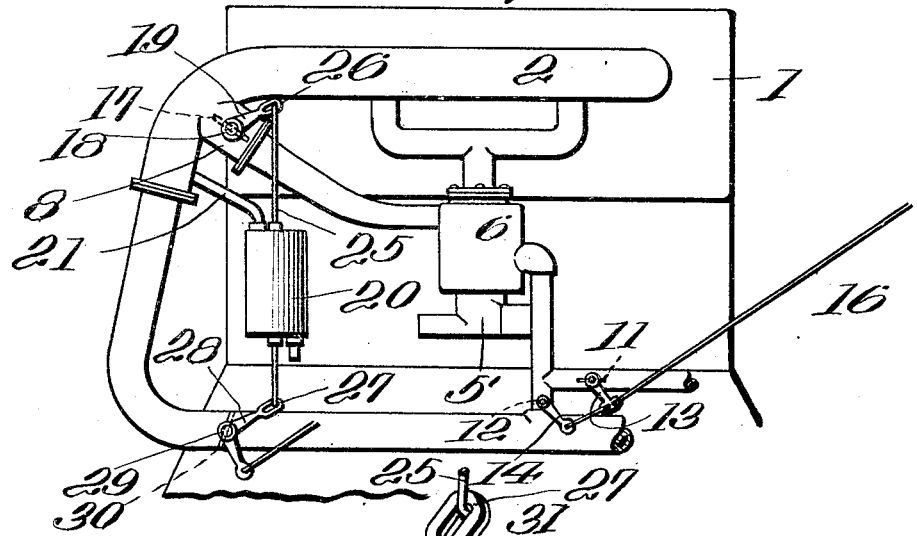
Inventor
D. P. MOLONY
Attorney Patented Feb. 9, 1932

1,844,041

UNITED STATES PATENT OFFICE

DONALD P. MOLONY, OF FLINT, MICHIGAN, ASSIGNOR TO MARVEL CARBURETER COMPANY, OF FLINT, MICHIGAN, A CORPORATION OF INDIANA

AUTOMATIC CHARGE HEATING CONTROL FOR INTERNAL COMBUSTION ENGINES

Application filed June 24, 1924. Serial No. 722,155.

This invention relates to certain new and useful improvements in automatic charge heating control for internal combustion engines and is a continuation in part of my application for automatic charge heating control for internal combustion engines, filed October 23, 1919, Serial Number 332,702, the object being to provide an exhaust line with a valve actuated by the pressure in the exhaust line to completely close the exhaust line in order to divert the entire volume of exhaust gases through the heating chamber for heating the explosive charge in its passage to the internal combustion engine.

Another object of my invention is to provide a manual control for the outlet of the heating chamber whereby the exhaust gases after passing through the heat chamber can be diverted back into the exhaust line or allowed to discharge into the atmosphere.

Other and further objects and advantages of the invention will be hereinafter set forth and the novel features thereof defined by the appended claims.

In the drawings,

Figure 1 is a side elevation of an internal combustion engine showing the application of my improved construction of heat control, partly in section;

Figure 2 is a similar view showing the heating chamber disposed around the charge forming device instead of the induction pipe; and Figure 3 is a perspective view of the valve showing the manual controlling means therefor.

In the embodiment of my invention as shown in Figure 1, 1 indicates an internal combustion engine provided with an exhaust manifold 2 having an exhaust pipe 3 extending therefrom forming the main exhaust line which extends to the muffler, not shown.

The engine is provided with an intake manifold 4 to which is connected a charge forming device 5, the above description being given so that the application of my improved construction of automatic charge heating control can be readily understood when applied to an internal combustion engine of the ordinary construction now in use.

In carrying out my invention I arrange a heating chamber 6 around the intake manifold 4, said heating chamber being provided with an inlet pipe 7 extending to a branch 8 of the exhaust manifold 2.

The heating chamber is provided with an outlet 9 leading to the atmosphere as clearly shown, said outlet being provided with a branch 10 extending to the exhaust pipe 3. The outlet 9 and branch 10 are provided with valves 11 and 12 carrying valve stems provided with arms 13 and 14 which are connected together by a link 15 so that when the valve 11 is closed, the valve 12 is opened or vice versa.

The arm 13 has connected thereto an operating rod 16 extending to the dash of the motor vehicle so that the position of these valves can be controlled manually.

Disposed within the branch 8 is a valve 17 carried by valve stem 18 provided with an arm 19, said valve being adapted to control the passage of exhaust gases to the heat chamber 6. In order to control the position of the valve 17 by the exhaust pressure, I provide a pressure chamber 20 in communication at its upper end with the exhaust manifold 2 by an inlet pipe 21 and having an outlet 22 to the atmosphere.

Slidably mounted within the pressure chamber 20 is a piston 23 which is normally held in raised position by a coiled spring 24; said piston having a piston rod 25 extending therethrough and through the top and bottom of the pressure chamber as clearly shown, the upper end of the piston rod being loosely connected at 26 to the arm 19 of the valve 17 so that the valve 17 is normally held in open position in order to allow the exhaust gases to pass through the inlet pipe 7 into the heating chamber 6 so as to heat the explosive charge in its passage to the engine.

The other end of the rod 25 is loosely connected at 27 to an arm 28 carried by a valve stem 29 carrying a valve 30 disposed within the exhaust pipe 3 for completely closing the exhaust pipe in order to cause the entire volume of exhaust gases to pass by the valve 17 into the heating chamber 6.

In the embodiment of the invention as shown in Figure 2 which is identical to that shown in Figure 1 with the exception that the heat chamber 6' surrounds the charge forming device 5' and the description of the valves and operating means having been described in connection with Figure 1, are not described in connection with this figure, as Figure 2 is shown for the purpose of illustrating the position of the heat chamber and while I have shown two positions of the heat chamber, it is, of course, understood that my invention consists broadly in heating the explosive charge in its passage to the engine irrespective of the position of the heating chamber.

The valve stem 29 is provided with a pin 31 adapted to be engaged by the shoulders of a collar 32 loosely mounted thereon, said collar having an arm 33 from which extends an operating rod from the dash of the motor vehicle to which the device is attached so that the position of the valve 30 can be manually controlled from the dash in order to hold the valve closed for warming up the engine.

I am aware that various other controlling means can be used in connection with the automatic control and therefore I do not wish to limit myself to the various details of construction herein shown as my invention consists broadly in providing means for controlling the application of heat for heating the explosive charge in its passage to the engine by the pressure of the exhaust in the exhaust line, whereby the entire volume of exhaust gases will be diverted out of their natural path of travel through the heating chamber employed for heating the explosive charge.

By having two valves for controlling the application of heat, the heat can be controlled to a nicety and I have found in practice that the pressure in the exhaust line acting on the piston controls the position of these valves so that the explosive charge is prevented from being overheated. As the upper end of the piston is connected to the exhaust line, the pressure of the exhaust gases forces the piston downwardly so as to automatically open one valve and close the other so as to regulate the application of heat.

From the foregoing description it will be seen that I have provided an internal combustion engine with heating means for the explosive charge in which the application of heat is automatically controlled in connection with manually operated means for holding the valves in such a position that the entire volume of exhaust gases can be caused to travel through the heat chamber in warming up the internal combustion engine.

While in the drawings and specification I have shown and described a particular manner of controlling the dual operated valves, for either converting the gases back into the exhaust line from the heater or to the atmosphere, I do not wish to limit myself to a dash control or to any particular control.

What I claim is:—

1. The combination with an internal combustion engine having an intake pipe and exhaust pipe, a heating chamber for heating said intake pipe, said heating chamber being in communication with said exhaust pipe, a pressure chamber in communication with said exhaust pipe, a valve in the inlet to said heating chamber, a valve in said exhaust pipe and a movable member mounted in said pressure chamber having a connection with said valves.

2. The combination with an internal combustion engine having an intake and exhaust pipe, a charge forming device, a heating chamber for heating the charge in its passage from said charge forming device to said engine, said heating chamber having an inlet in communication with the exhaust pipe, a valve in said inlet provided with an arm, a valve in said exhaust pipe provided with an arm, a chamber in communication with said exhaust pipe, a piston working in said chamber and piston rods extending outwardly from the opposite ends of said chamber having a loose connection with the arms of said valves for automatically moving one valve into open position as the other valve moves into closed position.

In testimony whereof I hereunto affix my signature.

DONALD P. MOLONY.